United States Patent
Brown et al.

(10) Patent No.: US 9,003,505 B2
(45) Date of Patent: Apr. 7, 2015

(54) CROSS PLATFORM SOCIAL NETWORKING AUTHENTICATION SYSTEM

(75) Inventors: Nathan Brown, San Francisco, CA (US); Henry Joseph Sommer, San Francisco, CA (US); Andreas Selp Haugsnes, Mountain View, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,894

(22) Filed: Sep. 26, 2011

(65) Prior Publication Data

US 2012/0227087 A1    Sep. 6, 2012

Related U.S. Application Data

(63) Continuation of application No. 13/077,411, filed on Mar. 31, 2011.

(60) Provisional application No. 61/449,559, filed on Mar. 4, 2011.

(51) Int. Cl.
| | | |
|---|---|---|
| *H04L 29/00* | (2006.01) | |
| *H04L 29/06* | (2006.01) | |
| *H04W 4/20* | (2009.01) | |
| *G06Q 50/00* | (2012.01) | |
| *H04L 29/08* | (2006.01) | |

(52) U.S. Cl.
CPC ............. *H04L 65/403* (2013.01); *H04W 4/206* (2013.01); *G06Q 50/01* (2013.01); *H04L 67/306* (2013.01)

(58) Field of Classification Search
USPC ...................................... 726/7; 709/227, 229
See application file for complete search history.

(56) References Cited

U.S. PATENT DOCUMENTS

| | | |
|---|---|---|
| 6,769,068 B1 | 7/2004 | Brozowski et al. |
| 7,370,335 B1 | 5/2008 | White et al. |
| 7,565,494 B1 | 7/2009 | Todd et al. |
| 7,657,652 B1 | 2/2010 | Balaji |
| 7,673,327 B1 | 3/2010 | Polis et al. |
| 7,769,395 B2 | 8/2010 | Fiatal et al. |
| 7,801,971 B1 | 9/2010 | Amidon et al. |
| 7,827,208 B2 | 11/2010 | Bosworth et al. |
| 7,974,983 B2 | 7/2011 | Goeldi |

(Continued)

OTHER PUBLICATIONS

"U.S. Appl. No. 13/077,394, Application Filed Mar. 31, 11", 51 pgs.

(Continued)

*Primary Examiner* — Jeffrey Pwu
*Assistant Examiner* — Helai Salehi
(74) *Attorney, Agent, or Firm* — Schwegman Lundberg & Woessner, P.A.

(57) ABSTRACT

Disclosed in one example is a method of authenticating with multiple social network services. The method may include storing first authentication information associated with a user for a first social networking service using at least one computer processor, receiving second authentication information associated with the user for a second social networking service from a social networking application, and sending to the social networking application the first authentication information. The first authentication information may enable the social networking application to utilize a protected application programming interface call for the first social networking service and the second authentication information may enable the social networking application to utilize a protected application programming interface call for the second social networking service.

12 Claims, 7 Drawing Sheets

(56) References Cited

U.S. PATENT DOCUMENTS

| | | | |
|---|---|---|---|
| 8,078,741 | B2 | 12/2011 | Barnfield et al. |
| 8,086,253 | B1 | 12/2011 | Kalamkar et al. |
| 8,171,114 | B1 | 5/2012 | Dale et al. |
| 8,276,190 | B1 | 9/2012 | Chang et al. |
| 8,296,784 | B1 | 10/2012 | Brown et al. |
| 8,311,531 | B2 | 11/2012 | Haaparanta et al. |
| 8,332,488 | B1 | 12/2012 | Dale et al. |
| 8,347,322 | B1 | 1/2013 | Brown et al. |
| 8,352,969 | B2 | 1/2013 | Brown et al. |
| 8,352,970 | B2 | 1/2013 | Brown et al. |
| 8,386,250 | B2 | 2/2013 | Lloyd et al. |
| 8,429,277 | B2 | 4/2013 | Dale et al. |
| 8,438,231 | B2 | 5/2013 | Cai et al. |
| 8,453,218 | B2 | 5/2013 | Lan et al. |
| 8,522,137 | B1 | 8/2013 | Brown et al. |
| 8,549,073 | B2 | 10/2013 | Dale et al. |
| 8,700,735 | B1 | 4/2014 | Dale et al. |
| 8,745,134 | B1 | 6/2014 | Dale et al. |
| 2002/0065899 | A1 | 5/2002 | Smith et al. |
| 2003/0018670 | A1 | 1/2003 | Ashford et al. |
| 2004/0268231 | A1 | 12/2004 | Tunning |
| 2005/0193332 | A1 | 9/2005 | Dodrill et al. |
| 2005/0216550 | A1 | 9/2005 | Paseman et al. |
| 2006/0143303 | A1 | 6/2006 | Serenyi et al. |
| 2006/0265689 | A1 | 11/2006 | Kuznetsov et al. |
| 2007/0150603 | A1 | 6/2007 | Crull et al. |
| 2007/0300258 | A1 | 12/2007 | O'connor et al. |
| 2008/0182563 | A1 | 7/2008 | Wugofski et al. |
| 2009/0016504 | A1 | 1/2009 | Mantell et al. |
| 2009/0049525 | A1 | 2/2009 | D'Angelo et al. |
| 2009/0187865 | A1 | 7/2009 | Brownholtz et al. |
| 2009/0199275 | A1 | 8/2009 | Brock et al. |
| 2009/0292814 | A1* | 11/2009 | Ting et al. ............. 709/229 |
| 2009/0307332 | A1 | 12/2009 | Litwin |
| 2010/0010866 | A1 | 1/2010 | Bal et al. |
| 2010/0077045 | A1 | 3/2010 | Bercu et al. |
| 2010/0100952 | A1* | 4/2010 | Sample et al. ............. 726/9 |
| 2010/0114788 | A1* | 5/2010 | White et al. ............. 705/319 |
| 2010/0144788 | A1 | 6/2010 | Stensbol et al. |
| 2010/0199340 | A1 | 8/2010 | Jonas et al. |
| 2010/0217869 | A1 | 8/2010 | Esteban et al. |
| 2010/0223341 | A1 | 9/2010 | Manolescu et al. |
| 2010/0235578 | A1 | 9/2010 | Sih et al. |
| 2010/0274815 | A1 | 10/2010 | Vanasco |
| 2010/0281216 | A1 | 11/2010 | Patel et al. |
| 2010/0306099 | A1* | 12/2010 | Hirson et al. ............. 705/38 |
| 2011/0022580 | A1 | 1/2011 | Badulescu et al. |
| 2011/0023101 | A1 | 1/2011 | Vernal et al. |
| 2011/0040844 | A1 | 2/2011 | Lawler et al. |
| 2011/0047182 | A1 | 2/2011 | Shepherd et al. |
| 2011/0055333 | A1 | 3/2011 | Guy et al. |
| 2011/0113073 | A1 | 5/2011 | Chang |
| 2011/0113094 | A1 | 5/2011 | Chunilal |
| 2011/0145270 | A1 | 6/2011 | Christopher et al. |
| 2011/0145512 | A1 | 6/2011 | Adl-tabatabai et al. |
| 2011/0153759 | A1 | 6/2011 | Rathod |
| 2011/0154445 | A1 | 6/2011 | Schmidt-Karaca et al. |
| 2011/0161478 | A1 | 6/2011 | Formo et al. |
| 2011/0162038 | A1 | 6/2011 | Chunilal |
| 2011/0173397 | A1 | 7/2011 | Boyle et al. |
| 2011/0179161 | A1 | 7/2011 | Guy et al. |
| 2011/0219190 | A1 | 9/2011 | Ng et al. |
| 2011/0231489 | A1 | 9/2011 | Rathod |
| 2011/0238755 | A1 | 9/2011 | Khan et al. |
| 2011/0238766 | A1 | 9/2011 | Lew et al. |
| 2011/0239282 | A1 | 9/2011 | Svarfvar et al. |
| 2011/0251898 | A1 | 10/2011 | Scott et al. |
| 2011/0251970 | A1 | 10/2011 | Oien et al. |
| 2011/0270685 | A1 | 11/2011 | Marks et al. |
| 2012/0054631 | A1 | 3/2012 | Nurmi et al. |
| 2012/0072494 | A1 | 3/2012 | Wong et al. |
| 2012/0143973 | A1 | 6/2012 | Niewerth |
| 2012/0158715 | A1 | 6/2012 | Maghoul et al. |
| 2012/0173383 | A1 | 7/2012 | Badawiyeh et al. |
| 2012/0184363 | A1 | 7/2012 | Barclay et al. |
| 2012/0202587 | A1 | 8/2012 | Allen et al. |
| 2012/0214564 | A1 | 8/2012 | Barclay et al. |
| 2012/0215538 | A1 | 8/2012 | Cleasby et al. |
| 2012/0221645 | A1 | 8/2012 | Anthru et al. |
| 2012/0221962 | A1 | 8/2012 | Lew et al. |
| 2012/0226749 | A1 | 9/2012 | Dale et al. |
| 2012/0226759 | A1 | 9/2012 | Lew et al. |
| 2012/0227086 | A1 | 9/2012 | Dale et al. |
| 2012/0246245 | A1 | 9/2012 | Nilsson |
| 2012/0254902 | A1 | 10/2012 | Brown et al. |
| 2012/0254903 | A1 | 10/2012 | Brown et al. |
| 2012/0254904 | A1 | 10/2012 | Brown et al. |
| 2013/0006602 | A1 | 1/2013 | Zhu et al. |
| 2013/0024949 | A1 | 1/2013 | Baldwin et al. |
| 2013/0091204 | A1 | 4/2013 | Loh et al. |
| 2013/0326372 | A1 | 12/2013 | Angell et al. |

OTHER PUBLICATIONS

"U.S. Appl. No. 13/077,394, Response filed Mar. 22, 2012 to Non Final Office Action mailed Dec. 22, 2011", 15 pgs.

"U.S. Appl. No. 13/077,466, Response filed May 16, 2012 to Office Action mailed Feb. 16, 2012", 10 pgs.

"U.S. Appl. No. 13/244,878, Notice of Allowance mailed May 11, 2012", 5 pgs.

"U.S. Appl. No. 13/244,878, Preliminary Amendment filed Dec. 16, 2011", 3 pgs.

"U.S. Appl. No. 13/244,878, Response filed Apr. 30, 2012 to Non Final Office mailed Jan. 30, 2012", 10 pgs.

"U.S. Appl. No. 13/244,885, Examiner Interview Summary mailed Feb. 24, 2012", 1 pg.

"U.S. Appl. No. 13/244,885, Notice of Allowance mailed Feb. 24, 2012", 13 pgs.

"U.S. Appl. No. 13/244,885, Preliminary Amendment filed Dec. 12, 2011", 3 pgs.

"U.S. Appl. No. 13/244,888 Preliminary Amendment filed Dec. 12, 2011", 3 pgs.

"U.S. Appl. No. 13/244,888, Examiner Interiview Summary mailed Apr. 9, 2012", 4 pgs.

"U.S. Appl. No. 13/244,888, Non Final Office Action mailed Feb. 29, 2012", 9 pgs.

"U.S. Appl. No. 13/244,888, Response filed Apr. 30, 2012 to Non Final Office Action mailed Feb. 29, 2012", 11 pgs.

"U.S. Appl. No. 13/244,938, filed Sep. 26, 2011", 12 pgs.

"U.S. Appl. No. 13/244,938, Final Office Action mailed May 21, 2012", 17 pgs.

"U.S. Appl. No. 13/244,938, Response filed Mar. 22, 2012 to Non Final Office Action mailed Dec. 22, 2011", 15 pgs.

"U.S. Appl. No. 13/244,941, filed Sep. 26, 2011", 58 pgs.

"U.S. Appl. No. 13/244,941, Response filed Mar. 21, 2012 to Non Final Office Action mailed Dec. 21, 2011", 12 pgs.

"U.S. Appl. No. 13/244,941, Final Office Action mailed May 21, 2012", 12 pgs.

"U.S. Appl. No. 13/244,942, filed Sep. 26, 2011", 59 pgs.

"U.S. Appl. No. 13/244,942, Examiner Interview Summary mailed Feb. 7, 2012", 3 pgs.

"U.S. Appl. No. 13/244,942, Response filed Mar. 22, 2012 to Non Final Office Action mailed Dec. 22, 2011", 14 pgs.

"SocialStream", [Online Video]. Carnegie Mellon University HCII, 2006. [retrieved on Apr. 30, 2012]. Retrieved from the Internet: <URL: http://www.hcii.cmu.edu/M-HCI/2006/SocialstreamProject/Socialstream_demo.mov > (5 minutes, 6 seconds) 29.0 MB.

Microsoft Computer Dictionary, Fifth Edition, Microsoft Press, (2002), p. 499.

U.S. Appl. No. 13/077,394, Examiner Interview Summary Mailed Feb. 8, 2012, 3 pgs.

U.S. Appl. No. 13/077,394, Non Final Office Action Mailed Dec. 22, 2011, 16 pgs.

U.S. Appl. No. 13/077,466, Non Final Office Action mailed Feb. 16, 2012, 6 pgs.

U.S. Appl. No. 13/244,878, Non Final Office Action mailed Jan. 30, 2012, 8 pgs.

U.S. Appl. No. 13/244,938, Non Final Office Action mailed Dec. 22, 2011, 18 pgs.

(56) References Cited

OTHER PUBLICATIONS

U.S. Appl. No. 13/244,941, Examiner Interview Summary mailed Feb. 8, 2012, 3 pgs.
U.S. Appl. No. 13/244,941, Non Final Office Action mailed Dec. 21, 2011, 15 pgs.
U.S. Appl. No. 13/244,942, Examiner Interview Summary mailed Feb. 7, 2012, 3 pgs.
U.S. Appl. No. 13/244,942, Non Final Office Action mailed Dec. 22, 2011, 18 pgs.
"OpenSocial: Frequently Asked Questions", Google.com, 2011 [retrieved on Dec. 9, 2011]. Retrieved from <http://code.google.com/apis/opensocial/faq.html>, 2 pgs.
"Social network aggregation", Wikipedia.org, Nov. 11, 2011 [retrieved on Dec. 6, 2011]. Retrieved from <http://en.wikipedia.org/wiki/Social_network_aggregation>, 3 pgs.
"Socialstream", [Online]. Carnegie Mellon University HCII, 2006. [retrieved on Dec. 6, 2011]. Retrieved from < http://www.hcii.cmu.edu/M-HCI/2006/SocialstreamProject/socialstream.php>, 2 pgs.
"Socialstream Features", [Online]. Carnegie Mellon University HCII, 2006. [retrieved on Dec. 6, 2011]. Retrieved from Internet: < http://www.hcii.cmu.edu/M-HCI/2006/SocialstreamProject/features.php>, 3 pgs.
"The OAuth 1.0 Protocol", E. Hammer-Lahav (ed.), Internet Engineering Task Force (IETF), Request for Comments: 5849, Category: Informational, ISSN: 2070-1721, (Apr. 2010), 38 p.
"The OAuth 2.0 Authorization Protocol", E. Hammer-Lahav et al. (eds.), draft-ietf-oauth-v2-13, Network Working Group, Obsoletes: 5849 (if approved), Intended status: Standards Track, (Feb. 16, 2011), 44 p.
"Vinehub Login", Vinehub, 2011 [retrieved on Dec. 6, 2011]. Retrieved from < http://www.vinehub.com/index.php/login/>, 1 pg.
"Vinehub: Frequently Asked Questions", Vinehub, 2011 [retrieved on Dec. 6, 2011]. Retrieved from < http://www.vinehub.com/index.php/pages/faq/>, 1 pg.
"Web Application Toolkit for Social Network APIs", Microsoft, Jul. 15, 2010 [retrieved on Dec. 9, 2011]. Retrieved from <URL: http://archive.msdn.microsoft.com/watsocial, 2 pgs.
Morin, Dave, "Announcing Facebook Connect", [online]. Facebook, May 9, 2008 [retrieved on Feb. 14, 2012]. Retrieved from < developers.facebook.com/blog/post/108/ >, 2 pgs.
Mulligan, Catherine, "Open API Standardisation for the NGN Platform", Proceedings of the First ITU-T Kaleidoscope Academic Conference, (2008), 8 pgs.
Perez, Sarah, "Vinehub: New Social Network Connector to Aggregate, Update Multiple Services", ReadWriteWeb, May 20, 2010 [retrieved on Dec. 6, 2011]. Retrieved from <http://www.readwriteweb.com/archives/vinehub_new_social_network_connector_to_aggregate_update_multiple_services.php#.TuJLoUXQb3o.email>, 3 pgs.
Schroeder, S., "20 Ways to Aggregate Your Social Networking Profiles", mashable.com, Jul. 17, 2007. Retrieved from <http://mashable.com/2007/07/17/social-network-aggregators/>, 8 pgs.
"U.S. Appl. No. 13/190,281, Non Final Office Action mailed Nov. 9, 2012", 34 pgs.
"U.S. Appl. No. 13/244,888, Non Final Office Action mailed Nov. 14, 2012", 10 pgs.
"U.S. Appl. No. 13/244,938, Notice of Allowance mailed Oct. 16, 2012", 7 pgs.
"U.S. Appl. No. 13/244,941, Notice of Allowance mailed Oct. 16, 2012", 7 pgs.
"U.S. Appl. No. 13/077,411 , Response filed May 1, 2013 to Non Final Office Action mailed Dec, 6, 2012", 16 pgs.
"U.S. Appl. No. 13/077,411, Non Final Office Action mailed Dec. 6, 2012", 20 pgs.
"U.S. Appl. No. 13/077,440, Non Final Office Action mailed Apr. 29, 2013", 10 pgs.
"U.S. Appl. No. 13/190,281 , Response filed Apr. 9, 2013 to Non Final Office Action mailed Nov. 9, 2012", 20 pgs.
"U.S. Appl. No. 13/190,281, Notice of Allowance mailed May 10, 2013", 10 pgs.
"U.S. Appl. No. 13/244,878, Notice of Allowance mailed Feb. 13, 2013", 5 pgs.
"U.S. Appl. No. 13/244,888 , Response filed Apr. 15, 2013 to Non Final Office Action mailed Nov. 14, 2012", 15 pgs.
"U.S. Appl. No. 13/077,411, Final Office Action mailed Aug. 27, 2013", 20 pgs.
"U.S. Appl. No. 13/077,411, Response filed Jan. 22, 2014 to Final Office Action dated Aug. 27, 2013", 17 pgs.
"U.S. Appl. No. 13/077,425, Non Final Office Action mailed Oct. 9, 2013", 15 pgs.
"U.S. Appl. No. 13/077,425, Response filed Feb. 10, 2014 to Non-Final Office Action dated Oct. 9, 2013", 12 pgs.
"U.S. Appl. No. 13/077,440, Examiner Interview Summary mailed Oct. 28, 2013", 3 pgs.
"U.S. Appl. No. 13/077,440, Final Office Action mailed Oct. 15, 2013", 5 pgs.
"U.S. Appl. No. 13/077,440, Notice of Allowance mailed Nov. 26, 2013", 7 pgs.
"U.S. Appl. No. 13/077,440, Response filed Sep. 30, 2013 to Non Final Office Action mailed Apr. 29, 2013", 9 pgs.
"U.S. Appl. No. 13/077,440, Response filed Nov. 8, 2013 to Final Office Action mailed Oct. 15, 2013", 8 pgs.
"U.S. Appl. No. 13/244,888, Notice of Allowance mailed Jul. 19, 2013", 15 pgs.
"U.S. Appl. No. 13/680,176, Non Final Office Action mailed Sep. 12, 2013", 6 pgs.
"U.S. Appl. No. 13/680,176, Notice of Allowance mailed Feb. 5, 2014", 10 pgs.
"U.S. Appl. No. 13/680,176, Response filed Jan. 13, 2014 to Non-Final Office Action dated Sep. 12, 2013", 8 pgs.
"U.S. Appl. No. 13/077,394, Notice of Allowance mailed Sep. 10, 2012", 7 pgs.
"U.S. Appl. No. 13/077,466, Notice of Allowance mailed Aug. 8, 2012", 11 pgs.
"U.S. Appl. No. 13/190,281, Examiner Interview Summary mailed Aug. 29, 2012", 2 pgs.
"U.S. Appl. No. 13/244,878, Notice of Allowance mailed Jul. 17, 2012", 5 pgs.
"U.S. Appl. No. 13/244,888, Final Office Action mailed Jul. 6, 2012", 10 pgs.
"U.S. Appl. No. 13/244,888, Response filed Oct. 8, 2012 to Final Office Action mailed Jul. 6, 2012", 11 pgs.
"U.S. Appl. No. 13/244,938, Response filed Aug. 21, 2012 to Final Office Action mailed May 21, 2012", 11 pgs.
"U.S. Appl. No. 13/244,941, Response filed Aug. 21, 2012 to Final Office Action mailed May 21, 2012", 8 pgs.
"U.S. Appl. No. 13/244,942, Corrected Notice of Allowance mailed Aug. 24, 2012", 4 pgs.
"Facebook Markup Language (FBML)", [Online]. Retrieved from the Internet: <URL: developers.facebook.com/docs/reference/fbml/>, (Accessed Aug. 17, 2012).
"U.S. Appl. No. 13/077,425, Final Office Action mailed Jun. 5, 2014", 17 pgs.
"U.S. Appl. No. 13/077,440, Notice of Allowance mailed Mar. 17, 2014", 5 pgs.
"U.S. Appl. No. 13/735,669, Non Final Office Action mailed Apr. 30, 2014", 10 pgs.
"U.S. Appl. No. 14/272,123, Preliminary Amendment filed Aug. 5, 2014", 10 pgs.

\* cited by examiner

CROSS PLATFORM SOCIAL NETWORKING AUTHENTICATION SYSTEM

CLAIM OF PRIORITY

This application is a continuation of and claims the benefit of priority under 35 U.S.C. §120 to U.S. patent application Ser. No. 13/077,411, filed on Mar. 31, 2011, which claims the benefit of priority, under 35 U.S.C. Section 119(e), to U.S. Provisional Patent Application Ser. No. 61/449,559, entitled "CROSS SOCIAL NETWORK DATA. AGGREGATION," filed on Mar. 4, 2011 to Scott Dale et al., which are hereby incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc., 2011 All Rights Reserved.

BACKGROUND

A social networking service is an online service, platform or site that allows members to build or reflect social networks or social relations among members. Typically, members construct profiles, which may include personal information such as name, contact information, employment information, photographs, personal messages, status information, links to web related content, blogs, and so on. Typically, only a portion of a member's profile may be viewed by the general public, and/or other members.

The social networking site allows members to identify and establish links or connections with other members in order to build or reflect social networks or social relations among members. For instance, in the context of a business networking service, a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member then has the option of accepting or declining the invitation. If the second member accepts the invitation, the first and second members are connected.

In general, a connection or link may represent or may be otherwise associated with an information access privilege, such that a first person who has established a connection with a second person is, via the establishment of that connection, authorizing the second person to view or access non-publicly available portions of their profiles. Of course, depending on the particular implementation of the business/social networking service, the nature and type of the information that may be shared as well as the granularity with which the access privileges may be defined to protect certain types of data can vary greatly.

A variety of different social networking services have gained popularity, include FACEBOOK® of Palo Alto, Calif., MYSPACE® of Beverly Hills, Calif. and run by News Corp., LINKEDIN® of Mountain View, Calif., TWITTER® of San Francisco, Calif., and the like. These sites often allow for third party applications to utilize certain functionality provided by the host social networking service. In some examples, these third party applications may utilize certain user interface (UI) elements of the social networking service, access personal information about a user including profile information, and send and receive social interactions, such as messages, to the user of the third party application or to their connections. FACEBOOK®, for example allows developers to create applications which are integrated into the FACEBOOK® user interface and with the FACEBOOK® social networking system. In some examples, these applications may include games such as CITYVILLE®, FARMVILLE®, and MAFIAWARS®, all developed by ZYNGA®, Inc. of San Francisco Calif. These applications appear in a FACEBOOK® page, and make use of various features of FACEBOOK®, such as contacting friends to encourage them to join the game and play with the user and the like.

The social networking services integrate with these applications by providing to these applications an Application Programming interface or "API." In general, an Application Programming Interface (API) is a particular set of rules and specifications that a software program may follow to access and make use of the services and resources provided by another particular software program that implements that API. The API serves as an interface between different software programs and facilitates their interaction.

Figure 1:
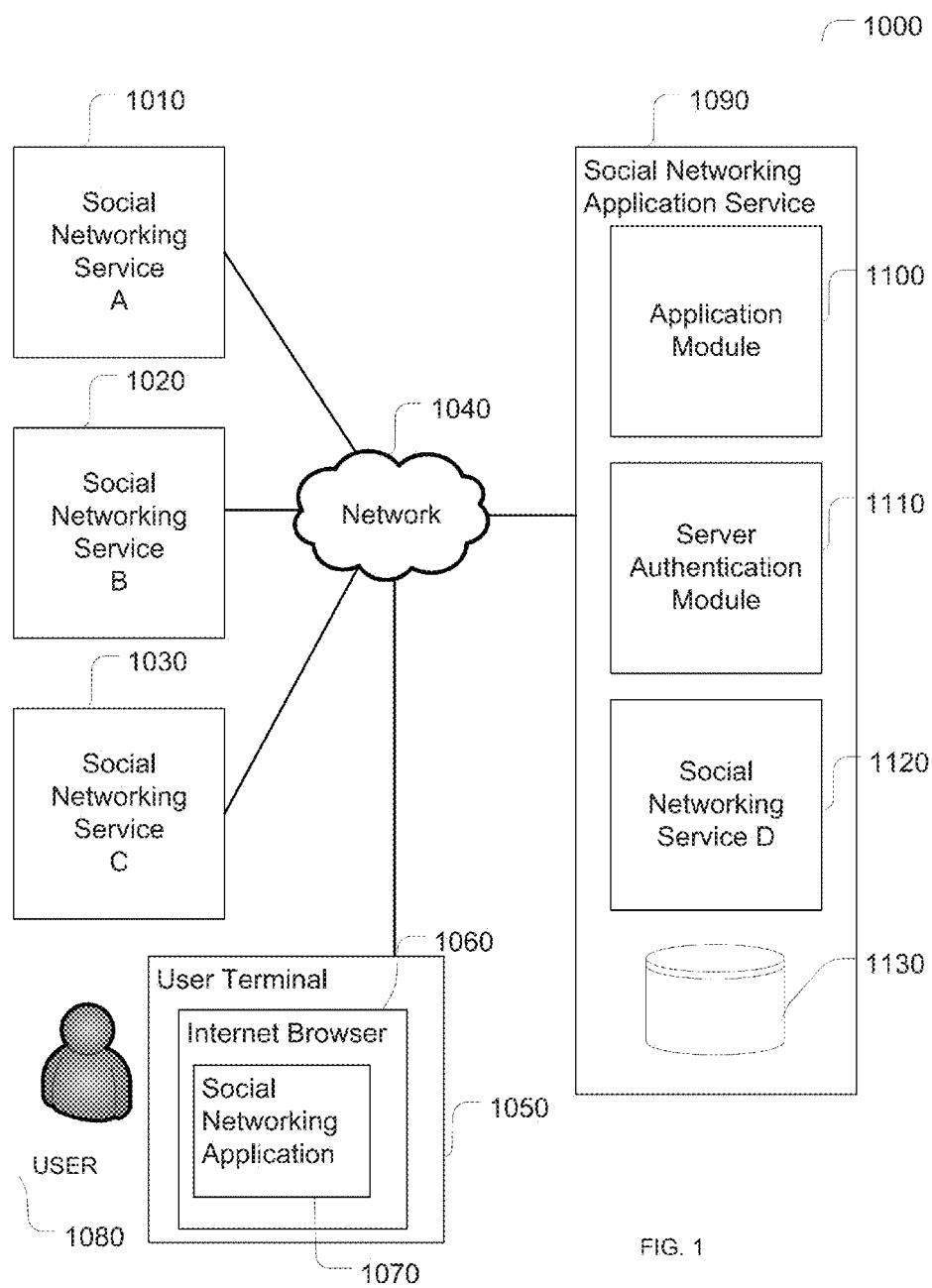
FIG. 1 shows a schematic of an example system according to the present disclosure.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In some social networks, in order for an application to be associated with and access certain APIs of a social networking service certain authentication and/or authorization steps must be performed. A social networking application is associated with a social networking service when the application has been authenticated with that social networking service in a way that allows the social networking application to utilize the API of that social networking service. Typically, API calls requiring authentication return personal information such as a user's social graph or information from the user's member profile or allow the social networking application to take action on behalf of the member. A social graph describes relationships between individuals online. Thus, for example, if two members of a social networking service are "connected," both users' social graph will reflect this connection. Typically, these authentication and/or authorization steps can involve authenticating the user, authenticating the social networking application, and authorizing the social networking application to access the particular API call. In some examples, social networking services can utilize the OAuth open authentication methods including OAuth versions 1.0, 1.0 REVISION A, WRAP and 2.0. Information on OAuth can be found by referring to the Internet Engineering Task Force Request for Comment 5849 and Internet-Draft IETF OAuth 2.0 Authorization Protocol v. 2-12 (dated Jan. 20, 2011), both of which are herein incorporated by reference in their entirety.

OAuth provides a method for social networking applications to access certain protected information stored by, and functionalities provided by, social networking services on behalf of a member of that social networking service. One of the stated goals of OAuth is to allow the members to grant access to social networking applications to information and functionalities of social networking services on their behalf without disclosing to the social networking applications their username and password. The end result of the OAuth authentication process in some examples is an access token which the social networking applications can use to act on behalf of the member according to the permissions granted by the member. A benefit of this process is that by using a token, the user can change or revoke the permissions granted without changing the credentials used to login to the social networking service.

An access token is a unique identifier issued by the social networking service and used by the social networking application to associate authenticated requests with the member whose authorization is requested or has been obtained by the social networking application. In some examples, these access tokens have a matching shared-secret that is used by the social networking application to establish its ownership of the access token and its authority to represent the member. In some examples, the access token represents the establishment of a "session" between the social networking application and the social networking server. A session, also known as a communication session, is a permanent or semi-permanent interactive information exchange between communicating devices that is established at a certain point in time and torn down at a later point in time. The token, and subsequently the session, can have an expiry time at which point the session is closed by the social networking service and the token expires such that any API call to the social networking service that utilizes the token will be rejected.

Once a social networking application is authenticated and authorized, the social networking application can access certain API calls (depending on the permissions granted by the user) of the social networking service to which it has authenticated with and is associated with. In some examples, it may be beneficial for that application to have access to user data on other social networks and to be able to execute certain API calls on those other social networks. This allows the application to provide a richer experience for a user as it allows for aggregation of personal information and connections stored or associated with multiple social networking services, as well as messaging and other API functionality associated with other social networking services.

Utilization of multiple disparate social networking service API functionality involves overcoming several difficulties. First, social networking services may not allow an application that is not currently executing within their framework to authenticate or authorize. Second, in some examples the application is displayed, or executed, in an IFRAME HTML element of the host social networking service after it is retrieved from a server. An IFRAME, or inline frame, places another fang document in a frame of the current page. Thus, in some examples, the social networking application is displayed as if it were embedded into the social networking service's own pages. In some examples, the social networking application can include HTML, JavaScript, ASP, PHP, MySQL, Flash, JAVA, AJAX, Silverlight, or other interactive web content and languages. While running the application in an IFRAME is advantageous because it appears that the application is a native application of the social network, there are disadvantages as well. Namely, in some cases, a user's internet browser, or the social networking service itself, prohibits the social networking application from contacting, or knowing about, any other URL except both the server from which the social networking application was retrieved and the social networking service itself. These security features prevent the application from directly contacting another social networking service to take advantage of the API functionality of that service. Finally, the multi-stage authentication and authorization process may have to be repeated for each social networking service (i.e. the user would likely have to login multiple times) which may be annoying to the user.

Disclosed is a system, a method, and a machine readable medium for authenticating with one or more social networking services in which the authorization and authentication information obtained by the social networking application after authenticating and/or authorizing with a social networking service is forwarded to a server, which maintains and stores that authentication information for that user. This authentication information can remain valid after the user exits the social networking application. As a result, a new social networking application can then make user of this stored authentication and authorization information. If the new social networking application is launched from the same social network as the stored authorization/authentication information, then it can utilize that information rather than having to reauthorize or reauthenticate. If the new social networking application is launched from a different social networking service than that of the stored authentication and authorization information, then the new social networking application can then make use of the social networking APIs and information for both the social networking service from which it was launched and the social networking service to which the previous authentication/authorization information is associated.

FIG. 1 shows one example system 1000. Typically a user, such as user 1080 will access and communicate with one or more social networking services 1010-1030, 1120 through network 1040. Social networking services 1010-1030, 1120 in some examples may include FACEBOOK®, MYSPACE®, LINKEDIN®, TWITTER®, and the like. In some examples, this communication may be done through the user terminal 1050. User terminal 1050 in some examples may include a personal computer, laptop computer, tablet computer, smart phone or other cellular telephone, electronic book reader, or any other device that allows a user to access the functionality of the social networking service. In some examples, an internet browser 1060 of the user terminal 1050 is used to access the social networking services 1010-1030 and 1120 using network 1040. Internet browser 1060 in some examples may include Internet Explorer® from Microsoft Corp., Redmond, Wash. Network 1040 may be any method by which user terminal 1050 may communicate with one or more social networking services 1010-1030. In some examples, network 1040 may include the internet, a WAN, LAN, cellular network, or any other method of allowing the user terminal 1050 to connect with the social networking service, and the like. While four social networking services are shown in FIG. 1 (1010-1030, 1120), it will be appreciated by those skilled in the art that the system and methods of the current disclosure are applicable to more or less than four social networks.

Typically, when a user 1080 accesses a social networking application (such as a game) the user 1080 selects the application via the social networking service 1010-1030, 1120 which then re-directs the user to download the application from another server. In some examples, this server may be located on a social networking application service 1090. The user's browser then displays or executes this application. In some examples, this social networking application 1070 may be or include HTML, JavaScript, Adobe Flash, Microsoft Silverlight, and the like. The social network 1010-1030, 1120 from which the user selected the content may be called the host social network. The user's browser then executes or displays this social networking application 1070 until the user 1080 decides to exit or the application closes or otherwise ends.

In some examples, while the application 1070 executes, it communicates with the host social networking service to which it is associated. Example communications include authenticating, authorizing, utilizing the user interface elements of the host social network, obtaining social network information about user 1080 such as connections with other users, sending messages to other users, and the like.

In some examples, social networking application 1070 may communicate with social networking application service 1090. Social networking application service 1090 may include various functions to assist social networking application 1070. In some examples, social networking application service 1090 may include application module 1100 which stores and delivers to user terminals (including user terminal 1050) social networking application 1070 from storage 1130. In other examples, application module 1100 may contain execution logic for social networking application 1070. Examples of this execution logic include responding to user actions and inputs; payment and purchasing information for purchasing the application or unlocking, accelerating, or making available various features in the application 1070; sending messages to and from various other users of the application; storing application data in data store 1130; providing various media files such as graphics, video, and sound files; and the like. While social networking application service is shown in FIG. 1 as one system, the components and the functionality of social networking application service 1090 could be distributed across multiple systems.

In some examples, social networking application service 1090 includes a server authentication module 1110 which works with client authentication module 2010 (FIG. 2) to authenticate/authorize social networking application 1070 with one or more social networking services 1010-1030. This will be discussed in greater detail later.

In some examples, social networking application service 1090 includes social networking service D 1120. Social networking service D 1120 is another social networking service that is associated with the social networking application service. In some examples social networking service D is run by social networking application service 1090 and thus is more tightly coupled to social networking application service 1090 than social networking services 1010-1030. In some examples social networking service D can provide a common framework for storing all the user 1080's personal information that may be stored across social networking services 1010-1030.

Figure 2:
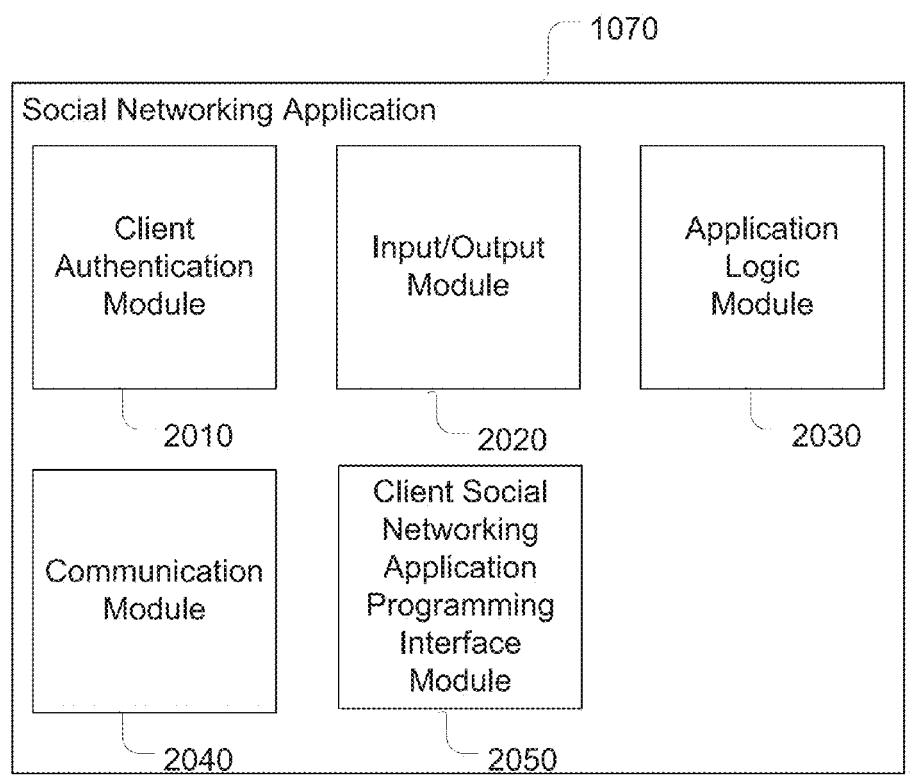
FIG. 2 shows a schematic of an example social networking application according to the present disclosure.

One example social networking application 1070 is shown in FIG. 2. A social networking application 1070 is any application which utilizes, or is capable of utilizing, the API of one or more social networking services. In some examples social networking application 1070 can contain an input/output module 2020. Input/output module 2020 communicates with the user 1080 through user terminal 1050. Input/output module 2020 is responsible for causing the user interface of the social networking application 1070 to be displayed and for handling user inputs.

Application logic module 2030 in some examples is responsible for implementing the primary functions of the social networking application 1070. For example, in the case of a game, the game logic and the game rules are implemented by application logic module 2030. Application logic module 2030 in some examples communicates with application module 1100 using communication module 2040 to communicate changes in application state, user interactions, and to receive instructions for processing application events. In other examples, application logic module 2030 has all the logic necessary to process any application state changes, user interactions and handling application events. In yet other examples application logic module 2030 has logic necessary for handling some application state changes, user interactions and application events while the remaining functionality is handled by application module 1100.

Communication module 2040 communicates with social networking service 1010-1030 and social networking application service 1090. In some examples, this communication can include network communication across network 1040. A variety of methods of communication can be used, including PHP, JavaScript, HTML, AJAX and the like.

Social networking application can include a client authentication module 2010 for managing authentication with one or more social networking services 1010-1030, 1120. Client authentication module 2010 works with server authentication module 1100 of social networking application service 1090 to authenticate and authorize with one or more of social networks 1010-1030, 1120. Client authentication module 2010 can contain the logic necessary to authenticate and authorize social networking application 1070 with social networking services 1010-1030, 1120. Once the client authentication module 2010 authenticates and authorizes the social networking application 1070, client authentication module 2010 receives and validates the authentication information returned from the social networking service. The client authentication module 2010 in some examples can then pass this authentication information to server authentication module 1110 of social networking application service 1090. The passed authentication information in some examples consists of the access token passed by the social networking service 1010-1030 after a session is created due to successful authentication and authorization. In other examples, other information may be passed, including any personal information retrieved from the social networking service 1010-1030 regarding the user 1080. In some examples, this authentication information includes both authorization information and authentication information. In general, the authentication information can include any information necessary to allow a social networking application to utilize an application programming interface on a social networking service, and in some examples information necessary to identify the user 1080.

Server authentication module 1110 of social networking application service 1090 receives this authentication information from client authentication module 2010. Server authentication module 1110 then stores this authentication information in data storage 1130. Server authentication module 1090 can then check data storage 1130 for any other authentication information relating to that user in other social networks 1010-1030, 1120 for the same or other applications. The authentication information in some cases can be related to a particular application available on multiple different social networks and in other cases can be application independent. Thus for example, FARMVILLE® may authenticate with a social networking service for user 1080 and that authentication information may later be used to authenticate that same user 1080 on the same social networking service for CITYVILLE®. In other cases, the authentication or application information may only be used for an instance of that same application (be it on the same or different social networking service). For example, the FARMVILLE® derived authentication information may only be used for FARMVILLE® applications and the like. If any other social networks have valid authentication information, server authentication module 1110 can then send that authentication information to client authentication module 2010 so that social networking application 1070 can utilize the API of other social networks.

In some examples, the authentication information can be shared with or sent to application module 1100 on social networking application service. Application module 1100 can assist social networking application 1070 in making certain API calls to certain social networking services 1010-1030, 1120. In some examples this is to work around certain browser or social networking service restrictions, but in other examples it can be utilized to increase social networking application 1070's performance.

Server authentication module 1110 is responsible for determining that user 1080 has active sessions on social networking services other than the social networking service that is associated with the currently running social networking application 1070. Because different social networks may have different user identification systems, in order to perform this association, server authentication module 1110 can use a variety of factors to associate the user 1080 of social networking application 1070 with authentication and authorization information previously stored in data storage 1130. Some factors include member id, name, social graphs (common friends), address, phone number, email address, TWITTER® account, website bank accounts, credit card information, and any other personal identifiable information. In yet other cases, the social networking application 1070 may prompt user 1080 to identify any other user accounts on other social networking services. Once an association is found or determined, the server authentication module 1110 can store this association of user 1080 to the various social networking services for faster processing when looking up authentication information in the future.

For example, if user 1080 is named "John Smith," and his phone number is "555-555-5555," and he is a member of social networking service A 1010 with member id "1234" and social networking service B 1020 with member id "5678", upon launching a social networking application 1070 associated with social networking service A 1010, social networking application 1070 sends the authentication/authorization information for social networking service A 1010 to server authentication module 1110 along with identifying information for user 1080. Server authentication module 1110 has no record of any other sessions for user 1080 and does not pass back any sessions to social networking application 1070. Once user 1080 launches another social networking application on social networking service B, that also communicates with social networking application service 1090, the server authentication module 1110 determines based on items such as name, phone number, etc. . . . that user 1080 has member account "1234" on social networking service A 1010 and "5678" on social networking service B 1020. The association is saved for later use, and any session on social networking service A 1010 is sent to the calling social networking application.

Figure 3:
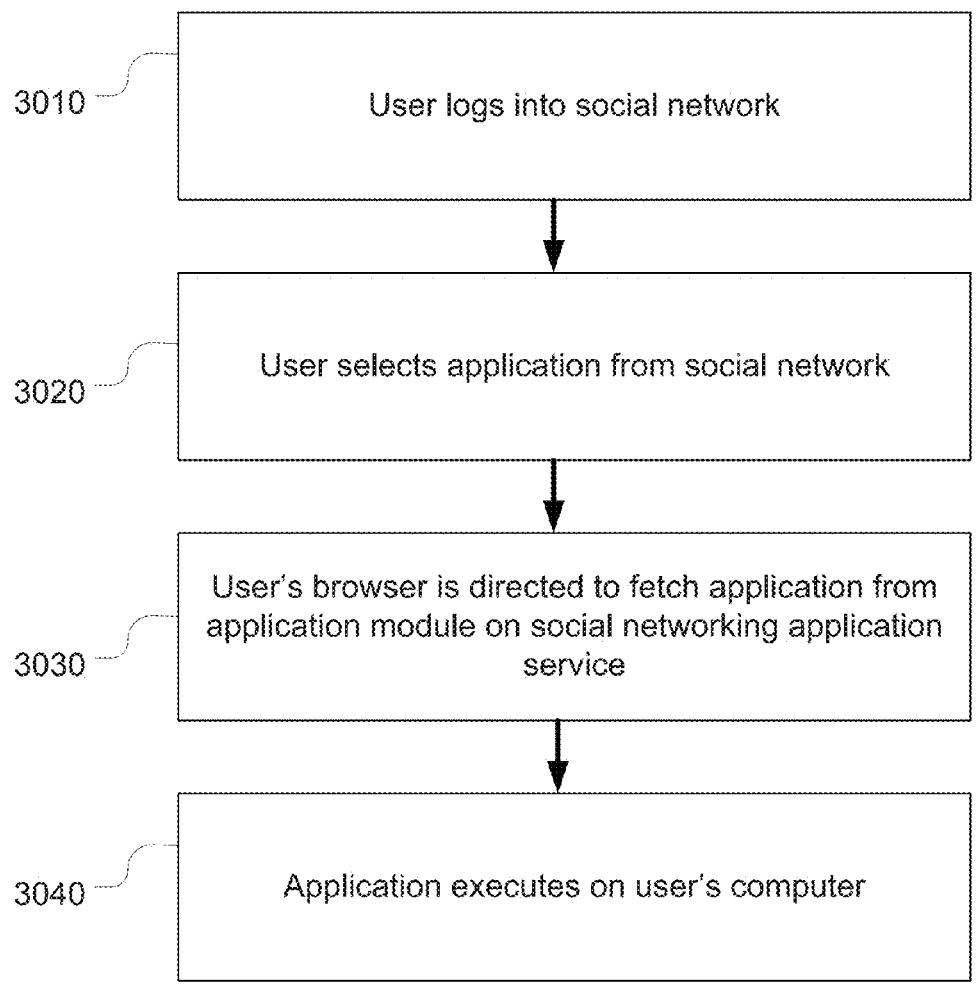
FIG. 3 shows a flowchart of a method of launching a social networking application according to one example of the present disclosure.

FIG. 3 shows one example method of the present disclosure. At 3010 a user logs onto one of the social networks 1010-1030, 1120. Usually, this requires the user to enter certain credentials. The credentials can include a username and a password, biometric data such as fingerprints, voice matching, PIN number, ID number, or the like. Once the user is logged in, in some examples, the social networking service stores an internet cookie on user terminal 1050 with information signifying that the user is logged in. At step 3020 the user selects an application from the social network. In some examples the application may be a game, productivity application such as a word processor, a spreadsheet, messaging application, marketplace application, media application, dating application, and any other application that may be associated with, or access the API of one or more social networking services. In other examples, the user may visit social networking application service 1090, which then may prompt the user 1080 to login to one of the social networking services 1010-1030, 1120 through the use of certain authentication and authorization APIs provided by social networking services 1010-1030, 1120.

At step 3030, the user's browser is directed to fetch or download an application from an application module 1100 on a social networking application service 1090 by the social networking service. In some examples the application is displayed in an IFRAME HTML element. In step 3040, the application executes on a user's computer or terminal 1050.

Figure 4:
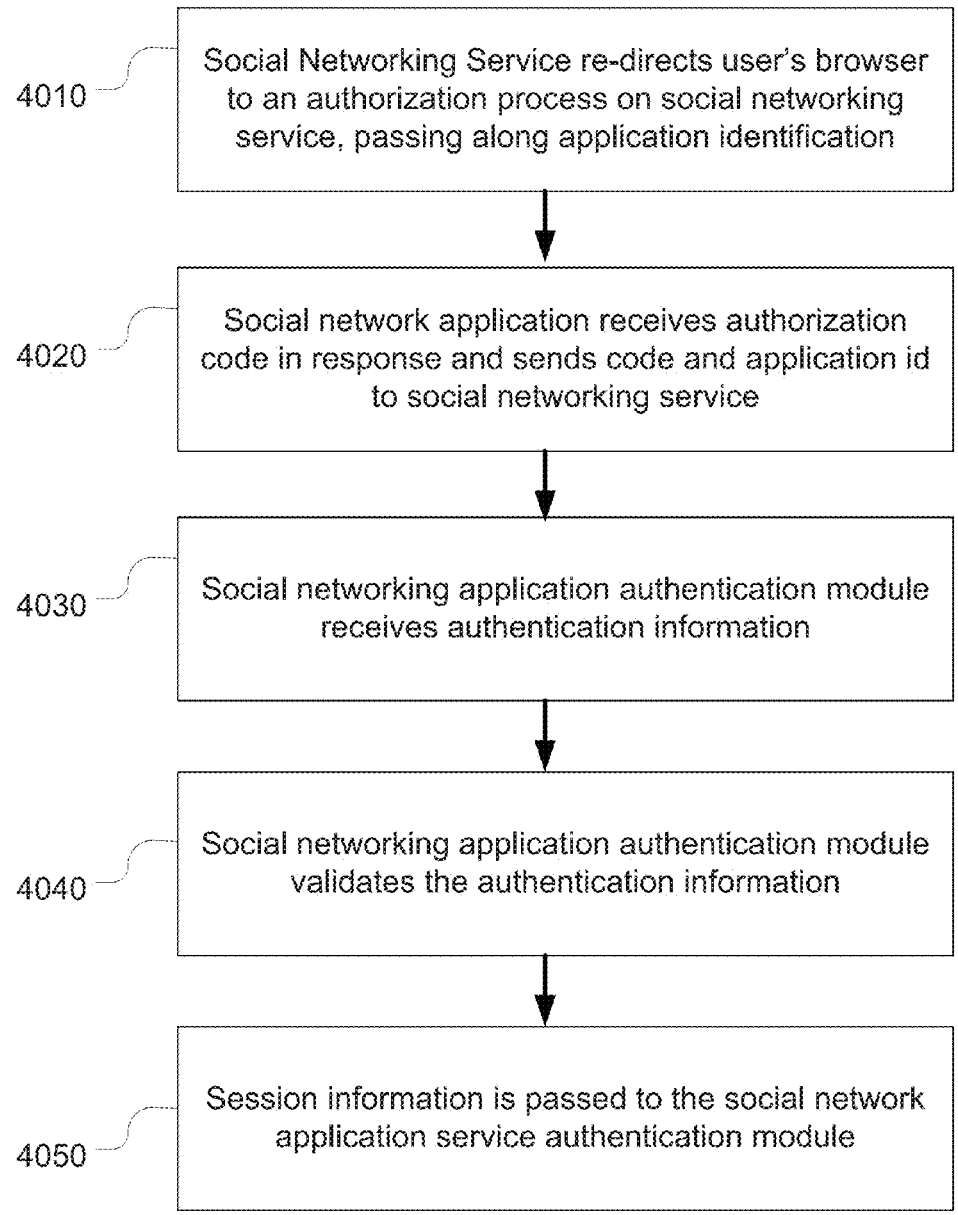
FIG. 4 shows a flowchart of a method of authorizing and authenticating a social networking application according to one example of the present disclosure.

Turning now to FIG. 4, in some examples, the social networking application client authentication module 2010 redirects internet browser 1060 to an authorization and authentication dialog on the social networking service. Social networking application 1070 passes an application id to social networking service. The application id identifies the application and is given to social networking application 1070 when social networking application 1070 registers with social networking service. In one example, the social networking service checks to see if the user is already logged in by checking for the internet cookie stored on user terminal 1050. If the cookie is not present, the social networking service requires the user to login. The user logs in by providing the social networking service with their credentials.

In one example, once the user is logged in, the social networking service asks the user 1080 to grant certain permissions to the social networking application 1070. These permissions are required to be granted by the user 1080 so that the social networking application can obtain personal information of the user and take actions on behalf of the user. Some example permissions include access to all or certain sections of a member profile page, access to information about a user's activities, birthday, education, hometown, relationships, religion or politics, status, videos, website, media, work information, email, lists of other members connected with a particular member, email messages, blog postings, news feed postings, chat applications, address information, and phone number. Other example permissions include allowing the application to post content and comments to the user's Hog or news feed or stream, or to post such content and comments to individuals who are connected with a particular user; creating events on behalf of the user; R.S.V.P. to events on behalf of the user; send SMS or text messages on behalf of the user and the like. In some examples, permissions can be read only, read/write, read/write/delete and the like. The user is given the option to grant or deny access. If the user denies access, authentication stops and the social networking application 1070 either terminates, or continues with reduced functionality. In other examples, before redirecting the user's browser 1060 to the authorization and authentication dialog, social networking application 1070 first obtains a request token from the social networking service, and uses the request token along with the application id to request the authorization and authentication dialog on the social networking service.

Once the user authorizes the application and authenticates with the social networking service, the social networking service passes back to the social networking application an authorization code or verifier at 4020. The social networking application can then send this code or verifier along with the application id, and in examples in which the request token is obtained, the request token, to the social networking service and can receive in return authentication information at 4030. The authentication information in some examples can be an access token which is passed to the social networking service as part of the API call to establish the social networking application's authority to utilize the API call. This access token can correspond to a "session," between the social networking application 1070 and the social networking service. This authentication information can then be used to access certain protected API's of the social networking service according to the permissions granted by user 1080.

In some examples, the communications between the social networking application and the social networking services are encrypted. In some examples, the communications are exchanged using HTTPS (Hypertext Transfer Protocol Secure), clear text but signed with a secret key that the application and the social networking service have previously determined, or any other encryption mechanisms can be used to prevent eavesdropping.

Social networking application client authentication module 2010 can validate the authentication information at 4040. In some examples, the validation ensures that the access token has not expired and is correctly formed. The authentication information can then be passed to the social network application service server authentication module 1110 at 4050 in order to store the authentication information and to signal social networking application service server authentication module 1110 to send to the social networking application client authentication module 2010 the authentication information of other social networks in order to allow API calls to other social networks. In some examples, the social networking application service can also send additional information in order to assist server authentication module 1110 in identifying the user 1080. This information can be gathered by social networking application 1070 by utilizing certain API calls of the social networking service to which it is authenticated and authorized.

Figure 5:
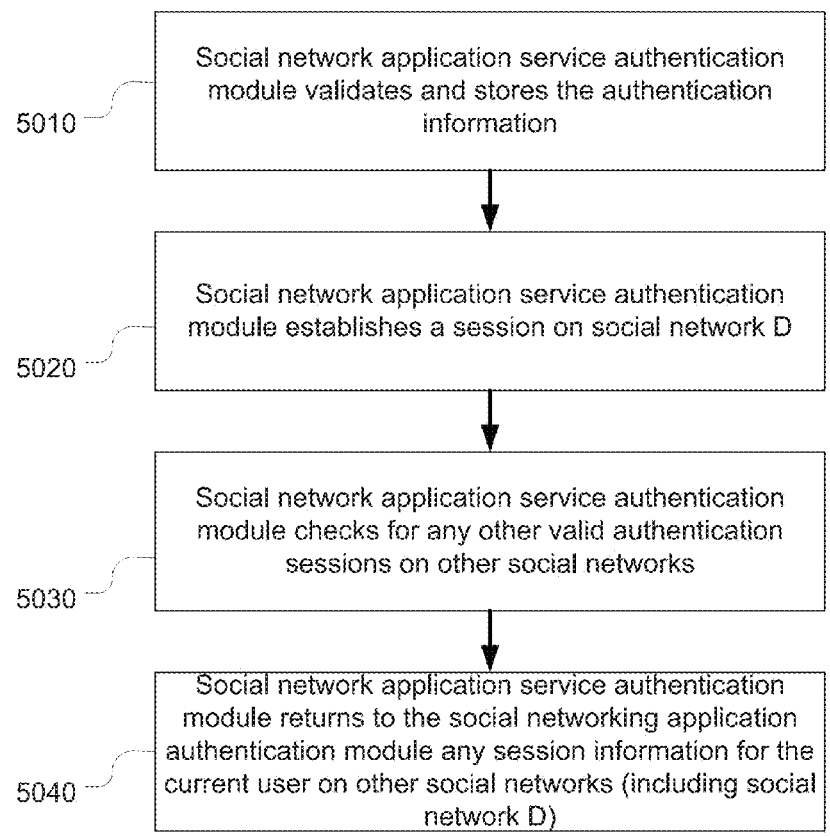
FIG. 5 shows a flowchart of a method of sharing authentication and authorization information with social networking applications according to one example of the present disclosure.
Figure 6:
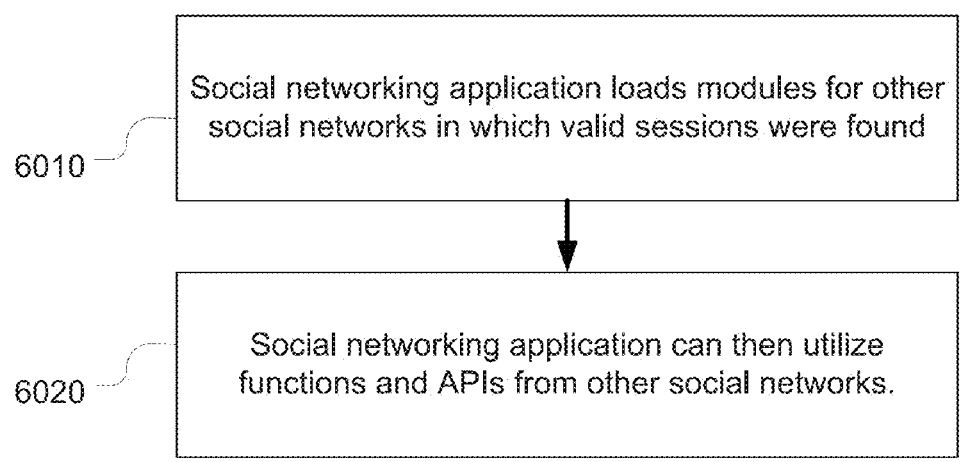
FIG. 6 shows a flowchart of a method of sharing authentication and authorization information with social networking applications according to one example of the present disclosure.

Turning now to FIG. 5, after receiving the authentication information, the social networking application service server authentication module 1110 validates the authentication information and stores it in step 5010. The validation in some examples is the same or similar to the validation procedures executed on the client authentication module 2010 of the social networking application 1070.

At 5020, social networking applications service in some examples establishes a session for user 1080 with social networking service D 1120 if one doesn't already exist based upon the authentication information and user information sent by social networking application 1070. Authentication information for the user 1080 sent back to client authentication module 2010 can include the authentication information for social networking service D. In some examples, social networking service D 1120 can be the server authentication module 1110.

In step 5030, the social networking application service server authentication module 1110 searches the data store 1130 for any other valid authentication information relating to other social networking services 1010-1030 and social networking service D 1120 for user 1080. If anything is found, the authentication information can be validated to make sure it is not expired.

At 5040, the social networking application service server authentication module 1110 returns to the social networking application client authentication module 2010 any valid authentication information for other social networking services, including in some examples, social networking service D 1120, that was found in step 5030.

Once this information is sent to social networking application 1070, the social networking application 1070 can load the appropriate code to handle the various social networking APIs for the social networks for which valid authentication information is associated. At 6020, the social networking application 1070 can then utilize the functions, APIs, and user data of other social networks by utilizing the authentication information, In some examples, the social networking application 1070 can query server authentication module 1110 for authentication information prior to authenticating with the host social networking service. The server authentication module 1110 may already have authentication information for user 1080 which can be sent to social networking application 1070. This can remove the need to reauthenticate or reauthorize, saving time and resources. In some examples, if the access token has expired, it may be possible to obtain a new access token simply by sending the application id or other identification along with the expired access token to the social networking service 1010-1030. The social networking service can then send back a fresh access token.

Other Notes and Examples

Disclosed in one example is a method of authenticating with multiple social network services. The method may include storing first authentication information associated with a user for a first social networking service using at least one computer processor, receiving second authentication information associated with the user for a second social networking service from a social networking application, and sending to the social networking application the first authentication information. The first authentication information may enable the social networking application to utilize a protected application programming interface call for the first social networking service and the second authentication information may enable the social networking application to utilize a protected application programming interface call for the second social networking service.

Disclosed in another example is a system for authenticating with multiple social networks. The system may include a storage module configured to store first authentication information associated with a user for a first social networking service using at least one computer processor, an authentication module configured to receive second authentication information associated with the user for a second social networking service from a social networking application and send to the social networking application the first authentication information. The first authentication information may enable the social networking application to utilize a protected application programming interface call for the first social networking service and the second authentication information may enable the social networking application to utilize a protected application programming interface call for the second social networking service.

Disclosed in another example is a method of communicating with multiple social networks. The method may include receiving at a social networking application first authentication information for a user from a first social networking service, sending the first authentication information to an authorization server, receiving from the authorization server second authentication information for a second social network for the user, and accessing an application programming interface of both the first and second social networking services using both the first and second authentication information.

Disclosed in another example is a machine readable storage medium that stores instructions, which when performed by a machine, causes the machine to perform operations. The operations may include storing first authentication information associated with a user for a first social networking service using at least one computer processor, receiving second authentication information associated with the user for a second social networking service from a social networking application, and sending to the social networking application the first authentication information. The first authentication information may enable the social networking application to utilize a protected application programming interface call for the first social networking service and the second authentication information may enable the social networking application to utilize a protected application programming interface call for the second social networking service.

Disclosed in yet another example is a machine readable storage medium that stores instructions, which when performed by a machine, causes the machine to perform operations. The operations may include receiving at a social networking application first authentication information for a user from a first social networking service, sending the first authentication information to an authorization server, receiving from the authorization server second authentication information for a second social network for the user, and accessing an application programming interface of both the first and second social networking services using both the first and second authentication information.

These examples can be combined in any permutation or combination. This non-limiting summary is intended to provide an overview of subject matter of the present patent application is not intended to provide an exclusive or exhaustive explanation of the invention. The detailed description is included to provide further information about the present patent application.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations.

Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 7:
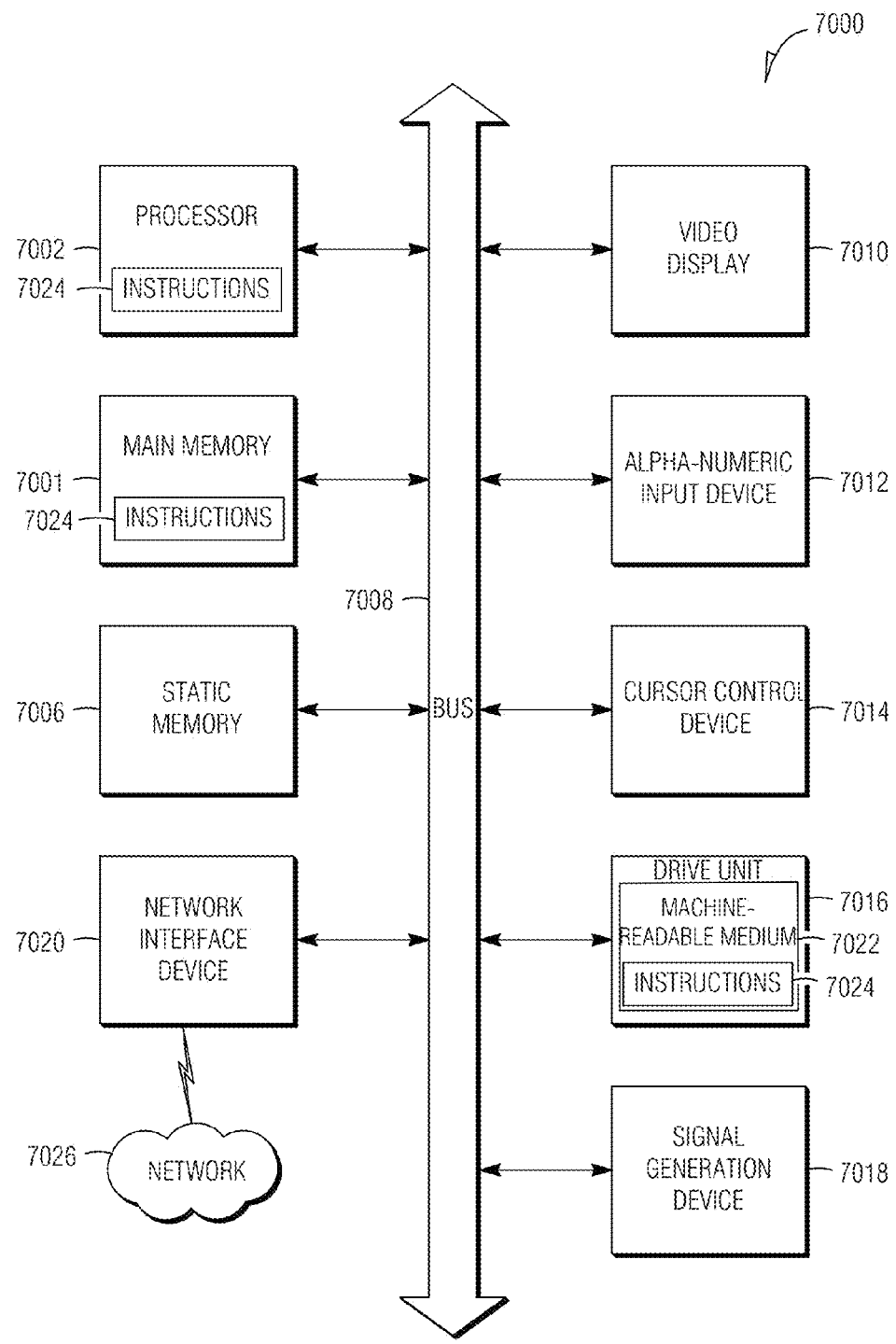
FIG. 7 shows a schematic example of a machine implementation according to one example.

FIG. 7 shows a diagrammatic representation of a machine in the example form of a computer system 7000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 7000 includes a processor 7002 (e.g., a Central Processing Unit (CPU), a Graphics Processing Unit (GPU) or both), a main memory 7001 and a static memory 7006, which communicate with each other via a bus 7008. The computer system 7000 may further include a video display unit 7010 (e.g., a Liquid Crystal Display (LCD) or a Cathode Ray Tube (CRT)). The computer system 7000 also includes an alphanumeric input device 7012 (e.g., a keyboard), a User Interface (UI) cursor controller 7014 (e.g., a mouse), a disk drive unit 7016, a signal generation device 7018 (e.g., a speaker) and a network interface device 7020 (e.g., a transmitter).

The disk drive unit 7016 includes a machine-readable medium 7022 on which is stored one or more sets of instructions 7024 and data structures (e.g., software) embodying or used by any one or more of the methodologies or functions illustrated herein. The software may also reside, completely or at least partially, within the main memory 7001 and/or within the processor 7002 during execution thereof by the computer system 7000, the main memory 7001 and the processor 7002 also constituting machine-readable media.

The instructions 7024 may further be transmitted or received over a (network 7026 via the network interface device 7020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof, or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
  at an application server:
    receiving from a social networking application first authentication information associated with a user and a social networking service, the social networking application provided to the user by the application server in response to a selection of the user made on the social networking service, the first authentication information indicating that the user is authenticated with the social networking service, the authentication information is configured to be used in a protected application programming interface call to the social networking service;
    associating the first authentication information with a user account, using one or more processors configured to perform the associating, based upon determining that at least one common connection is included in both a social graph of the user retrieved from the social networking service, and in a previously retrieved social graph linked to the user account, the previously retrieved social graph retrieved from a second social networking service that is distinct from the social networking service, the user account including second authentication information that is different from the first authentication information and is associated with the user and with the second social networking service, the second authentication information indicating that the user is authenticated on the second social networking service, the second authentication information is configured to be used in a protected application programming interface call to the second social networking service;
    storing the authentication information as part of the user account; and
    sending both the first authentication information and the second authentication information to a second social networking application in response to a request from the second social networking application, the second social networking application provided to the user by the application server in response to a selection of the user made on the second social networking service.

2. The method of claim 1,
  wherein associating the first authentication information with a user account is also based upon determining that a name of the user from the social networking service matches a previously retrieved name from the second social networking service linked to the user account.

3. The method of claim 1, wherein associating the first authentication information with a user account is also based upon determining that a phone number of the user from the social networking service matches a previously retrieved phone number from the second social networking service linked to the user account.

4. The method of claim 1, comprising:
receiving an input of the user; and
wherein associating the first authentication information with a user account is also based upon the input of the user.

5. A system comprising:
an application server comprising one or more processors configured to include:
a server authentication module configured to:
receive from a social networking application first authentication information associated with a user and a social networking service, the social networking application provided to the user by the application server in response to a selection of the user made on the social networking service, the first authentication information indicating that the user is authenticated with the social networking service, the authentication information configured to be used in a protected application programming interface call to the social networking service;
associate the first authentication information with a user account based upon a determination that at least one common connection is included in both a social graph of the user retrieved from the social networking service, and in a previously retrieved social graph linked to the user account, the previously retrieved social graph retrieved from a second social networking service that is distinct from the social networking service, the user account including a second authentication information that is different from the first authentication information and is associated with the user and with the second social networking service, the second authentication information indicating that the user is authenticated on the second social networking service, the second authentication information is configured to be used in a protected application programming interface call to the second social networking service;
store the authentication information as part of the user account; and
send both the first authentication information and the second authentication information to a second social networking application, the second social networking application sent by the application server in response to a selection made on the second social networking service, in response to a request.

6. The system of claim 5, wherein the server authentication module is configured to associate the first authentication information with a user account also based upon a determination that a name of the user from the social networking service matches a previously retrieved name from the second social networking service linked to the user account.

7. The system of claim 5, wherein the server authentication module is configured to associate the first authentication information with a user account also based upon a determination that a phone number of the user from the social networking service matches a previously retrieved phone number from the second social networking service linked to the user account.

8. The system of claim 5, wherein the server authentication module is configured to associate the first authentication information with a user account also based upon an input of the user.

9. A non-transitory machine-readable medium that stores instructions which when performed by a machine, causes the machine to perform operations comprising: at an application server:
receiving from a social networking application first authentication information associated with a user and a social networking service, the social networking application provided to the user by the application server in response to a selection of the user made on the social networking service, the first authentication information indicating that the user is authenticated with the social networking service, the authentication information is configured to be used in a protected application programming interface call to the social networking service;
associating the first authentication information with a user account, using one or more processors configured to perform the associating, based upon determining that at least one common connection is included in both a social graph of the user retrieved from the social networking service, and in a previously retrieved social graph linked to the user account, the previously retrieved social graph retrieved from a second social networking service that is distinct from the social networking service, the user account including second authentication information that is different from the first authentication information and is associated with the user and with the second social networking service, the second authentication information indicating that the user is authenticated on the second social networking service, the second authentication information is configured to be used in a protected application programming interface call to the second social networking service;
storing the authentication information as part of the user account; and
sending both the first authentication information and the second authentication information to a second social networking application in response to a request from the second social networking application, the second social networking application provided to the user by the application server in response to a selection of the user made on the second social networking service.

10. The machine-readable medium of claim 9, wherein the operations of associating comprise associating the first authentication information with a user account also based upon determining that a name of the user from the social networking service matches a previously retrieved name from the second social networking service linked to the user account.

11. The machine-readable medium of claim 9, wherein the operations of associating comprise associating the first authentication information with a user account also based upon determining that a phone number of the user from the social networking service matches a previously retrieved phone number from the second social networking service linked to the user account.

12. The machine-readable medium of claim 9, wherein the operations of associating comprise associating the first authentication information with a user account also based upon a user input of the user.

* * * * *